United States Patent

Siepmann, Sr.

[15] 3,686,969

[45] Aug. 29, 1972

[54] VALVE CONSTRUCTION

[72] Inventor: Walter Siepmann, Sr., Belecke, Moehne, Germany

[73] Assignee: Stahl-Armaturen Persta GmbH KG, Belecke/Moehne, Germany

[22] Filed: Dec. 23, 1970

[21] Appl. No.: 101,025

[30] Foreign Application Priority Data

Dec. 29, 1969 Germany..........P 19 65 250.7

[52] U.S. Cl. .............74/424.8 VA, 74/552, 251/267
[51] Int. Cl.................................................F16h 1/10
[58] Field of Search ...........74/552, 553, 548, 89.15, 424.8 VA; 287/53 H; 251/267, 266

[56] References Cited

UNITED STATES PATENTS 2,297,137  9/1942  Fennema...........74/424.8 VA
1,736,405  11/1929  Houser et al.......74/424.8 VA

*Primary Examiner*—William F. O'Dea
*Assistant Examiner*—F. D. Shoemaker
*Attorney*—Michael S. Striker

[57] ABSTRACT

A handwheel has a hub and a projecting portion extends axially from the hub and is of one piece therewith. An axial bore in the projecting portion is tapped and the projecting portion is provided in its outer peripheral surface with an annular groove. A valve-housing has a passage accommodating the projecting portion and a plurality of bearing-ring segments are confined in the goove with retaining means retaining the projecting portion and ring segments in the passage. A valve spindle extends through the passage and has a threaded portion meshing with the threads in the tapped bore.

9 Claims, 4 Drawing Figures

Patented Aug. 29, 1972 3,686,969

INVENTOR
WALTER SIEPMANN, SR.
BY
*[signature]*
ATTORNEY 3,686,969

VALVE CONSTRUCTION

BACKGROUND OF THE INVENTION

The present invention relates generally to a valve construction, and more particularly to an improved handwheel and journalling therefor which find use in such an improved valve construction.

The invention is particularly concerned with the type of valve construction where the valve member is moved via a valve spindle which cooperates with a turnable handwheel journalled in the valve housing. In one known construction the handwheel and the spindle nut are separately produced, that is they are individual items which are then connected with one another so that the spindle will move in response to turning of the handwheel. For journalling of the handwheel it is necessary to provide additional components, such as a sleeve which retains the spindle nut in the valve housing portion. The valve housing portion is provided with an internal thread meshing with the sleeve and the connection of spindle nut and handwheel together with the various auxiliary components necessary to journal the handwheel and retain it and the spindle nut in position, requires not only various further components but also is evidently fairly complicated because of the number of different items to be assembled, aside from the expenses involved in producing these items in the first place. In addition, the valve construction cost is relatively high because of these various components. The handwheel projects relatively far from the valve housing. All in all, this prior-art construction is not satisfactory because it is too expensive and is rather space-consuming.

SUMMARY OF THE INVENTION

It is, accordingly, an object of the present invention to overcome the aforementioned disadvantages.

More particularly, it is an object of the present invention to provide an improved valve construction which is not possessed of the aforementioned disadvantages.

A concomitant object is to provide such an improved valve construction in which the handwheel, the journalling therefor and the connection of the spindle with the handwheel are all of very simple construction and configuration, thereby being readily assemblable and being comparatively inexpensive to produce and to put together.

Still another object of the invention is to provide such an improved valve construction which has an absolute minimum number of individual components.

A concomitant object of the invention is to provide such an improved valve construction in which the handwheel can be mounted on the valve housing in a highly simplified manner but without sacrificing accuracy.

In pursuance of the above objects, and others which will become apparent hereafter, one feature of the invention resides in an embodiment which, briefly stated, comprises in a valve the combination of a handwheel portion having a hub and a projecting portion extending axially from the hub of one piece therewith and having an axial bore. Threads are provided in the axial bore and an annular groove is provided in the outer peripheral surface of the projecting portion. A valve-housing portion has a passage accommodating the projecting portion and a plurality of bearing-ring segments is confined in the groove. A valve spindle extends through the passage and has a threaded spindle portion received in the bore and meshing with the threads and retaining means retains the projecting portion and ring segments in the passage.

In a construction such as the exemplary one just outlined above, the handwheel and the spindle nut are of one piece with one another, in that it is the projecting portion projecting from the hub of the handwheel portion which constitutes the spindle nut. Such a unitary body is particularly well suited for manufacturing by a forging operation in a forging die. It is not necessary to provide means for connecting the handwheel and the spindle nut as was previously the case, and this in turn makes it possible to make the handwheel of considerably smaller wall thickness than previously possible. Concomitantly, the axial length of the projection constituting the spindle nut can be held to a minimum and therefore the total height of the handwheel including the projecting portion constituting the spindle nut can be decreased considerably over what is known from the art.

It is preferable but not absolutely necessary that the thread for the spindle nut, that is the thread with which the spindle subsequently meshes, be directly cut into the projecting portion for which purpose the bore provided therein may simply be internally tapped. However, it is also possible to provide the thread in another manner, for instance in a separate element accommodated in the bore. When the bore is directly tapped, it is possible to reduce the diameter of the projecting portion constituting the spindle nut which is also an advantage not only in terms of savings of materials but also because it thus requires less space. The journalling of this unitary element in the valve housing is achieved in a very simple manner in that a relatively flat annular groove is provided in the outer peripheral surface of the projecting portion, being wide in axial direction of the latter. This groove is bounded by two axially spaced shoulders and can accommodate bearing-ring segments which need not be threaded and which serve the dual purpose of providing a journal as well as having a coupling function. Furthermore, the bore provided in the valve housing itself can now also be smooth, that is need not be tapped, contrary to what is known from the art. To retain the bearing-ring segments it is simply necessary to provide very simple retaining or arresting elements, preferably pins such as conically configurated steel pins, which are driven into transverse bores extending tangentially to the bearing-ring segments and the axis of the bore in the valve housing in which the bearing-ring segments are accommodated. Thus retained, the bearing-ring segments provide a good journal for the spindle nut, that is the projecting portion which is of one piece with the handwheel portion, and are prevented from changing their position in use. Thus, it is simply necessary to provide the bearing-ring segments and at least one but preferably two arresting pins to afford the necessary journalling for the handwheel with the projecting portion constituting the spindle nut, thereby affording a very rapid assembly of the various components. At the same time, of course, this also affords a very rapid disassembly if such is needed for repair or other purposes, because it is only necessary to withdraw the arresting pin or pins and then to lift the handwheel with its projecting portion and bearingaring segments up outwardly away out of the bore in the valve housing.

According to a currently preferred embodiment of the invention the bearing-ring segments are constructed as semi-circular ring segments and the pins engage in grooves or recesses extending tangentially to the periphery of segments in the region of an axial end portion of the latter. When the pins are inserted to arresting position, the semi-circular ring segments are tightly retained in the bore of the valve housing which affords a very reliable retention of the ring segments. No radial force is exerted into the projecting portion constituting the spindle nut so that the danger of clamping or freezing, or of other difficulties in turning of the spindle nut, is avoided.

The novel features which are considered as characteristic for the invention are set forth in particular in the appended claims. The invention itself, however, both as to its method of operation and construction, together with additional objects and advantages thereof, will be best understood from the following description of specific embodiments when read in connection with the accompanying drawing.

DESCRIPTION OF THE PREFERRED EMBODIMENTS

Figure 1:
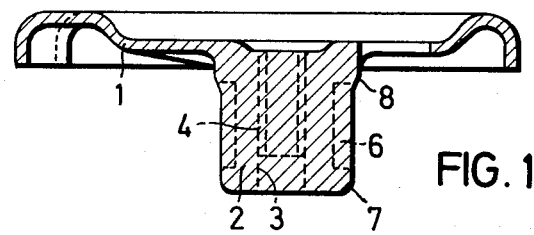
FIG. 1 is a vertical section through a handwheel portion and projecting portion unitary therewith.
Figure 2:
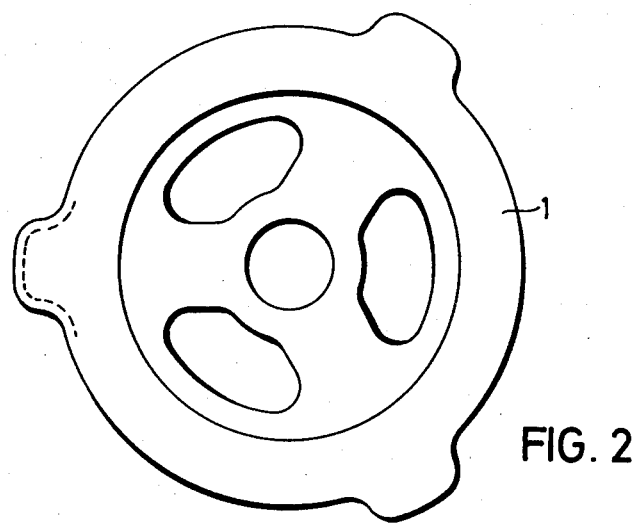
FIG. 2 is a top-plan view of FIG. 1.

The initial step in fabricating the wheel according to the present invention is to provide a blank which is formed in a forging apparatus or the like by means of a die to the configuration of FIGS. 1 and 2. The handwheel portion of the elements in FIGS. 1 and 2 is identified with reference numeral 1 and is of rather thin wall thickness; it is provided on its hub with a projecting portion 2 whose axial length approximately equals the diameter of the projecting portion. The handwheel portion 1 is provided with cut-outs or openings and with an arcuately deformed outer edge portion as illustrated, the purpose being on the one hand to reduce its weight and on the other hand to reinforce it. Such an element, which in essence already has the major characteristics of the final body, can be produced very economically in simple dies.

Figure 3:
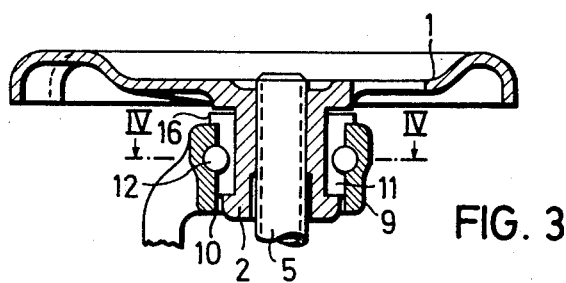
FIG. 3 is a view similar to FIG. 1 but showing the element of FIG. 1 installed in a valve housing.
Figure 4:
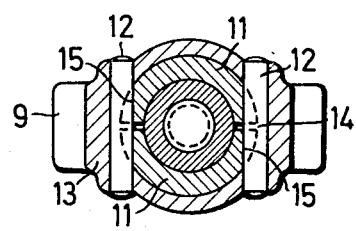
FIG. 4 is a section taken on line IV-IV of FIG. 3.

Now the projecting portion is provided with a bore or otherwise with a recess which is identified with reference numeral 3 and which in the illustrated embodiment is internally tapped to provide the screwthreads 4 which mesh with those of a valve spindle 5 shown in FIG. 3 which at its opposite non-illustrated end carries in known manner a valve body of the valve construction. The valve body is not shown because it in itself does not form a part of the present invention and may be conventional. The outer periphery of the projecting portion 2 is provided with an annular groove 6 which can be formed in suitable manner, for instance by material-removal methods. The groove 6 is shown in FIG. 1 only in dotted outline because it does not yet exist; FIG. 1 shows the blank before the groove 6 is formed, whereas FIG. 3 (in which the groove 6 is shown also) shows the blank after the groove is formed in it. It is relatively shallow but is elongated in axial direction of the projecting portion 2. In the direction towards the underside of the handwheel portion 1 it is bounded by a shoulder 8 and in the direction towards the free end of the projecting portion 2 the groove 6 is bounded by a shoulder or bead 7. Aside from the internal threads 4 the unitary handwheel portion 1 and projecting portion 2 requires no further threads at 11. This in itself is a considerable simplification.

In FIG. 3 a portion of the valve housing is identified with reference numeral 9. It is known that this valve housing portion is usually provided on the cover of an armature housing of a valve and it is provided in conventional manner with a vertical bore 10. The length of the bore 10 approximately corresponds to that of the projecting portion 2 or may be somewhat less. The inner diameter of the bore 10 may correspond to the outer diameter of the projecting portion 2 but it is preferable to leave a certain amount of radial play in accordance with the considerations which will be evident from the present disclosure.

The projecting portion 2 constitutes the spindle nut, as has already been pointed out before. It is journalled in the housing portion 9 by ring segments 11 which in the illustrated embodiment are each of semi-circular configuration so that there are two of them provided. There could, however, be more than two and their arcuate configuration would correspondingly vary from the semi-circular configuration shown in the illustrated embodiment. In any case, a certain amount of play is allowed between the adjacent ends of the segments 11 and the latter are so configured that they surround the projecting portion 2 and make it possible for the latter to turn but to be precisely journalled and retained in the vertical bore 10 of the valve housing portion 9. The axial length of the segments 11 corresponds approximately to the axial length of the groove 6.

Arresting means is provided, here illustrated in form of arresting or retaining pins 12 which are slightly conical and which may consist of steel or another material. Transverse bores 13 are provided in the valve housing portion 9 intersecting the bore 10 therein and extending approximately tangential to the inner diameter of the bore 10. In the illustrated embodiment two of the bores 13 are provided, and correspondingly two of the pins 12 which extend in parallelism with one another and are arranged diametrally opposite one another. Once inserted they retain the segments 11 in the bore 10 against axial displacement, but permit the handwheel portion 1 and the projecting portion 2 to turn within the journal constituted by the segments 11.

In a currently preferred embodiment the two segments 11 are so arranged that the plane or partition 14 between them extends normal to the plane in which the pins 12 are located. The end sections of the segments 11 are provided with recesses 15 into which the pins 12 extend in part, whereby the segments 11 are retained from their end sections by means of the pins 12 and are prevented from axial displacement, being radially urged against the inner wall bounding the bore 10 by the pins 12.

It will be appreciated how the construction according to the present invention as illustrated in the exemplary embodiment is assembled. Firstly, the two segments 11 are placed into the groove 6 whereupon the projecting portion 2 with the segments 11 is inserted into the bore 10 of the housing portion 9. Now it is either possible to thread the valve spindle 5 into the threads 4 from below, or—if the spindle was previously inserted from below into the bore 10, the handwheel portion 1 can be turned in a sense causing the threads 4 to mesh with those of the spindle 5. In any case, turning of the handwheel portion 1 is continued until the shoulder 16 of the segments 11 rests on the upper surface of the housing portion 9. It is merely necessary during assembly to make certain that the segments 11 with their recesses 15 are inserted in proper position into the bore 10 so as to be properly aligned with the transverse bores 13. Finally, the pins 12 are pressed or in hammered into the transverse bores 13, thereby engaging the recesses 15 of the segments 11 and retaining the latter against axial displacement in the bore 10, as well as preventing them from turning movement therein, while permitting rotation of the projecting portion 2 in the thus-provided journal.

It will be understood that each of the elements described above, or two or more together, may also find a useful application in other types of constructions differing from the types described above.

While the invention has been illustrated and described as embodied in a valve construction, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

1. In a valve, in combination, a handwheel portion having a hub; a projecting portion extending axially from said hub of one piece therewith and having an axial bore; threads in said axial bore; an annular groove in an outer peripheral surface of said projecting portion; a valve-housing portion having a passage accommodating said projecting portion; a plurality of bearing-ring segments confined in said groove; a valve spindle extending through said passage and having a threaded spindle portion receive in said bore and meshing with said threads; and retaining means retaining said projecting portion and ring segments in said passage, said retaining means comprising at least one retaining pin extending tangentially of said projecting portion and engaging the same and said housing portion.

2. In a valve as defined in claim 1, said handwheel portion being a thin walled, one-piece substantially disk-shaped element, and said projecting portion projecting from one axial side of said hub.

3. In a valve as defined in claim 2, wherein said handwheel portion and said projecting portion are forged.

4. In a valve as defined in claim 1, wherein said axial bore is bounded by an inner surface, and wherein said threads are provided in said inner surface.

5. In a valve as defined in claim 1, wherein said projecting portion has opposite axial ends, and wherein said retaining means engages said projecting portion intermediate said opposite axial ends.

6. In a valve, in combination, a handwheel portion having a hub; a projecting portion extending axially from said hub of one piece therewith and having an axial bore; threads in said axial bore; an annular groove in the outer peripheral surface of said projecting portion; a valve-housing portion having a passage bounded by a smooth inner surface and accommodating said projecting portion; a pair of substantially diametrally opposite auxiliary bores provided in said housing portion intersecting said passage tangentially of said projecting portion; a plurality of bearing-ring segments confined in said groove; a valve spindle extending through said passage and having a threaded spindle portion received in said bore and meshing with said threads; and retaining means retaining said projecting portion and ring segments in said passage, said retaining means including retaining pins accommodated in said auxiliary bores and engaging said projecting portion.

7. In a valve as defined in claim 6, wherein said pins are of conically tapering configuration.

8. In a valve as defined in claim 6, wherein said pins consist of steel.

9. In a valve as defined in claim 6, wherein said ring segments have recesses provided in their respective outer surfaces and extending tangentially of said projecting portion, and wherein said pins in part extend into the respective recesses.

* * * * *